(12) United States Patent
Walker et al.

US011300806B2

(10) Patent No.: US 11,300,806 B2
(45) Date of Patent: Apr. 12, 2022

(54) MULTI-IMAGE PROJECTION METHOD UTILIZING BIT SEGMENT RATE SWITCHING

(71) Applicant: Brass Roots Technologies, LLC, Plano, TX (US)

(72) Inventors: Bradley William Walker, McKinney, TX (US); Gregory Scott Vestal, Melissa, TX (US); Frank Joseph Poradish, Allen, TX (US)

(73) Assignee: BRASS ROOTS TECHNOLOGIES, LLC, Plano, TX (US)

( * ) Notice: Subject to any disclaimer, the term of this patent is extended or adjusted under 35 U.S.C. 154(b) by 0 days.

(21) Appl. No.: 16/675,470

(22) Filed: Nov. 6, 2019

(65) Prior Publication Data

US 2020/0150447 A1     May 14, 2020

Related U.S. Application Data

(60) Provisional application No. 62/757,458, filed on Nov. 8, 2018.

(51) Int. Cl.
| | | |
|---|---|---|
| *H04N 13/341* | (2018.01) | |
| *H04N 13/324* | (2018.01) | |
| *H04N 13/398* | (2018.01) | |
| *G02B 30/24* | (2020.01) | |
| *G02B 30/25* | (2020.01) | |
| *H04N 13/156* | (2018.01) | |

(52) U.S. Cl.
CPC .............. *G02B 30/24* (2020.01); *G02B 30/25* (2020.01); *H04N 13/324* (2018.05); *H04N 13/341* (2018.05); *H04N 13/398* (2018.05); *H04N 13/156* (2018.05)

(58) Field of Classification Search
CPC .. H04N 13/341; H04N 13/398; H04N 13/363; H04N 13/337; H04N 13/324; H04N 2213/008; H04N 13/334; H04N 13/339; H04N 13/161; H04N 13/332; H04N 13/344; H04N 2201/0089; H04N 19/597; H04N 13/10; H04N 13/00; H04N 13/349; H04N 13/368; H04N 13/211; H04N 13/214; H04N 21/2365; H04N 21/4347; H04N 21/8456; G02B 30/25; G02B 30/24; G02B 2027/0112; G03B 35/16; G02F 1/1323; G02F 1/133621
See application file for complete search history.

(56) References Cited

U.S. PATENT DOCUMENTS

| | | | |
|---|---|---|---|
| 6,774,916 B2 | 8/2004 | Pettitt et al. | |
| 7,446,785 B1 | 11/2008 | Hewlett et al. | |
| 7,576,759 B2 | 8/2009 | Pettitt et al. | |
| 2007/0085902 A1* | 4/2007 | Walker | H04N 13/398 |
| | | | 348/51 |
| 2011/0032441 A1* | 2/2011 | Robinson | G02B 30/27 |
| | | | 349/33 |

(Continued)

*Primary Examiner* — Alison Slater
(74) *Attorney, Agent, or Firm* — Jackson Walker LLP

(57) ABSTRACT

The present disclosure pertains to a method for 3D or multi-viewer projection of images. The method switches back and forth between left and right eye or multi-viewer data at single bit segment or multiple bit segment rates in a single projected image to create high quality 3D stereo or multi-viewer imaging with no motion artifacts.

6 Claims, 4 Drawing Sheets

(56) References Cited

U.S. PATENT DOCUMENTS

| | | | |
|---|---|---|---|
| 2011/0221876 A1* | 9/2011 | MacNaughton | H04N 13/341 |
| | | | 348/56 |
| 2015/0070749 A1* | 3/2015 | McDonald | G02B 26/0841 |
| | | | 359/291 |
| 2017/0013254 A1* | 1/2017 | Andersson | H04N 13/366 |
| 2019/0379881 A1* | 12/2019 | Tewes | H04N 13/254 |
| 2020/0371378 A1* | 11/2020 | Makinen | G02B 30/60 |

* cited by examiner

FIG. 2

| R1 | R2 | G1 | G2 | B1 | B2 | R1 | R2 | G1 | G2 | B1 | B2 | R1 | R2 | G1 | G2 | B1 |
|---|---|---|---|---|---|---|---|---|---|---|---|---|---|---|---|---|
| BS 1 | BS 1 | BS 1 | BS 1 | BS 1 | BS 1 | BS 2 | BS 2 | BS 2 | BS 2 | BS 2 | BS 2 | BS 3 | BS 3 | BS 3 | BS 3 | BS 3 |

| R1 | R2 | G1 | G2 | B1 | B2 | R1 | R2 | G1 | G2 | B1 | B2 | R1 | R2 | G1 | G2 | B1 | B2 |
|---|---|---|---|---|---|---|---|---|---|---|---|---|---|---|---|---|---|
| BS N-2 | BS N-2 | BS N-2 | BS N-2 | BS N-2 | BS N-2 | BS N-1 | BS N-1 | BS N-1 | BS N-1 | BS N-1 | BS N-1 | BS N | BS N | BS N | BS N | BS N | BS N |

FIG. 3

| R1 | G1 | B1 | R2 | G2 | B2 | R1 | G1 | B1 | R2 | G2 | B2 | R1 | G1 | B1 | R2 | G2 | B2 |
|---|---|---|---|---|---|---|---|---|---|---|---|---|---|---|---|---|---|
| BS 1 | BS 1 | BS 1 | BS 1 | BS 1 | BS 1 | BS 2 | BS 2 | BS 2 | BS 2 | BS 2 | BS 2 | BS 3 | BS 3 | BS 3 | BS 3 | BS 3 | BS 3 |

| R1 | G1 | B1 | R2 | G2 | B2 | R1 | G1 | B1 | R2 | G2 | B2 | R1 | G1 | B1 | R2 | G2 | B2 |
|---|---|---|---|---|---|---|---|---|---|---|---|---|---|---|---|---|---|
| BS N-2 | BS N-2 | BS N-2 | BS N-2 | BS N-2 | BS N-2 | BS N-1 | BS N-1 | BS N-1 | BS N-1 | BS N-1 | BS N-1 | BS N | BS N | BS N | BS N | BS N | BS N |

FIG. 4

| R1 | R1 | R1 | R2 | R2 | R2 | G1 | G1 | G2 | G2 | B1 | B1 | B1 | B2 | B2 | B2 | R1 |
|----|----|----|----|----|----|----|----|----|----|----|----|----|----|----|----|----|
| BS 1 | BS 2 | BS 3 | BS 1 | BS 2 | BS 3 | BS 1 | BS 2 | BS 1 | BS 2 | BS 1 | BS 2 | BS 3 | BS 1 | BS 2 | BS 3 | BS 4 |

| R1 | R1 | R2 | R2 | G1 | G1 | G1 | G2 | G2 | G2 | B1 | B1 | B2 | B2 |
|----|----|----|----|----|----|----|----|----|----|----|----|----|----|
| BS N-1 | BS N | BS N-1 | BS N | BS N-2 | BS N-1 | BS N | BS N-2 | BS N-1 | BS N | BS N-1 | BS N | BS N-1 | BS N |

FIG. 5

| R1 | R1 | R1 | G1 | G1 | G1 | B1 | B1 | B1 | R2 | R2 | R2 | G2 | G2 | G2 | B2 | B2 | B2 |
|----|----|----|----|----|----|----|----|----|----|----|----|----|----|----|----|----|----|
| BS 1 | BS 2 | BS 3 | BS 1 | BS 2 | BS 3 | BS 1 | BS 2 | BS 3 | BS 1 | BS 2 | BS 3 | BS 1 | BS 2 | BS 3 | BS 1 | BS 2 | BS 3 |

| G2 | G2 | G2 | B2 | B2 | B2 | R1 | R1 | G1 | G1 | B1 | B1 | R2 | R2 | G2 | G2 | B2 | B2 |
|----|----|----|----|----|----|----|----|----|----|----|----|----|----|----|----|----|----|
| BS N-4 | BS N-3 | BS N-2 | BS N-4 | BS N-3 | BS N-2 | BS N-1 | BS N | BS N-1 | BS N | BS N-1 | BS N | BS N-1 | BS N | BS N-1 | BS N | BS N-1 | BS N |

FIG. 6

| RGB1 | RGB2 | RGB1 | RGB2 | RGB1 | RGB2 | RGB1 | RGB2 | RGB1 | RGB2 | RGB1 | RGB2 | RGB1 | RGB2 |
|---|---|---|---|---|---|---|---|---|---|---|---|---|---|
| BS 1 | BS 1 | BS 2 | BS 2 | BS 3 | BS 3 | BS 4 | BS 4 | BS 5 | BS 5 | BS 6 | BS 6 | BS 7 | BS 7 |

| RGB1 | RGB2 | RGB1 | RGB2 | RGB1 | RGB2 | RGB1 | RGB2 | RGB1 | RGB2 | RGB1 | RGB2 | RGB1 | RGB2 |
|---|---|---|---|---|---|---|---|---|---|---|---|---|---|
| BS N-6 | BS N-6 | BS N-5 | BS N-5 | BS N-4 | BS N-4 | BS N-3 | BS N-3 | BS N-2 | BS N-2 | BS N-1 | BS N-1 | BS N | BS N |

FIG. 7

| RGB1 | RGB2 | RGB1 | RGB1 | RGB2 | RGB2 | RGB1 | RGB2 | RGB1 | RGB1 | RGB1 | RGB2 | RGB2 | RGB2 |
|---|---|---|---|---|---|---|---|---|---|---|---|---|---|
| BS 1 | BS 1 | BS 2 | BS 3 | BS 2 | BS 3 | BS 4 | BS 4 | BS 5 | BS 6 | BS 7 | BS 5 | BS 6 | BS 7 |

| RGB1 | RGB1 | RGB1 | RGB2 | RGB2 | RGB2 | RGB1 | RGB2 | RGB1 | RGB1 | RGB2 | RGB2 | RGB1 | RGB2 |
|---|---|---|---|---|---|---|---|---|---|---|---|---|---|
| BS N-6 | BS N-5 | BS N-4 | BS N-6 | BS N-5 | BS N-4 | BS N-3 | BS N-3 | BS N-2 | BS N-1 | BS N-2 | BS N-1 | BS N | BS N |

MULTI-IMAGE PROJECTION METHOD UTILIZING BIT SEGMENT RATE SWITCHING

This application claims priority to U.S. Provisional Patent Application Ser. No. 62/757,458, entitled "Multi-Image Projection Method Utilizing Bit Segment Rate Switching," filed Nov. 8, 2018, the entire contents of which are hereby incorporated by reference.

BACKGROUND

The present disclosure pertains generally to methods for use in multiple image projection, including three dimensional (3D) and multiple viewer projection.

3D image projection methods use a variety of techniques to deliver a different image to the left versus the right eye to establish the perception of depth. Multi-viewer projection methods use a variety of techniques to deliver a different image to viewer1 versus viewer2. These methods include the use of passive filtered glasses that take advantage of different light polarization and spectrum, or active glasses that utilize switchable shutters to view different images at different time points for either each eye or each viewer. Images may be delivered on specialized screens and may require the use of more than one projector. Due to the inherent limitations in the technology, visual image artifacts and temporal skew between each displayed image may result.

SUMMARY

The present disclosure pertains to a method for multiple image projection that utilizes different color spectrums for different images (left eye and right eye images for 3D and viewer1 and viewer2 for multi-view) with switching between the image data at single bit segment or multiple bit segment rates. Conventional methods only switch image data at frame or sub-frame rates which are much slower and create a temporal skew between the images.

Generally, light can be separated to create different images by time (requiring the use of switchable active shutter glasses), polarization (requiring passive filtered glasses), or spectrum (requiring passive RGB1/RGB2 filtered glasses). The present method utilizes the latter, spectrum differentiation, combined with a temporal switch to alternate between RGB1 and RGB2 spectra on a single projector to create a high quality image with imperceptible skew between the two different displayed images.

With regard to the use of spectrum, it is important to note that full color images can be represented by three additive primary colors: red, green, and blue. These color primaries create a triangle in chromaticity and any color within the triangle can be created by proportioning the 3 colors appropriately. When using laser light sources that have narrow spectra, it is possible to have Reds, Greens, and Blues that are fairly close to one another in color, creating two largely overlapping color triangles that can be independently enabled. The primaries are far enough apart that they can be filtered such that one set of primaries (RGB1) is allowed to one image only and the other set (RGB2) is allowed to the other image only. This is called 6P stereo (6 Primary 3D). Most often this is done using two separate projectors, each having one set of primary colors making images. In this two projector setup, each viewer simultaneously receives images from each projector so there is no time skew imposed on the dual images. 6P light sources can be created by filtering white light sources or by using different colored sources like LEDs or Lasers. Lasers are the most efficient since they start out with a narrow spectrum and don't have additional filter losses.

Delivering different images simultaneously typically requires the use of a two projector system. To utilize a single projector, the light source must be switchable to provide different images at different time points. Some glasses may be switchable to permit each viewer to view the image it is intended to see at each specific time point. Or, passive glasses can be used if the different images provided at different time points are also separated based on polarization or spectrum. Current electronics for use in 3D and multi-viewer projection permit time-based switching between images, but only at a frame or sub-frame level. For example, for a 60 Hz frame rate, light would be delivered to a projector for 8.333 milliseconds, sub-frame 1, creating a complete left eye or viewer1 image and then light would be delivered to the same projector for an additional 8.333 milliseconds, sub-frame 2, creating the right eye or viewer2 image. Therefore at 16.666 milliseconds (60 Hz), a 3D or multi-viewer image is created, if the viewer has the appropriate glasses. Active shutter glasses would block the view to the right eye (or viewer2) when the left eye (or viewer1) image is displayed and then block the view to the left eye (or viewer1) when the right eye (or viewer2) image is displayed. If the different images utilize different spectrums, then the passive glasses would allow RGB1 to the left eye (or viewer1) and RGB2 to the right eye (or viewer2) without requiring active switching. In either case, the two images are separated by 8.33 milliseconds, creating objectionable artifacts on moving images. This becomes worse at Cinema frame rates which are typically 24 Hz causing up to 20.8 millisecond skew in single flash stereo.

The present invention utilizes a single projector with much faster switching between two different images. Rather than switching at a frame or sub-frame level, the method interleaves the two images' data into alternating bit segments or multiple bit segments which may be 10 to 500 microseconds in duration. The two different images' data could preferably utilize different spectra, e.g., RGB1 and RGB2, or the images could be distinguished by polarization if a sufficiently fast polarization switch was available. A portion of the left eye (or viewer1) image is projected, followed by a portion of the right eye (or viewer2) image (as binary bit segments) until full images are created in both images at the required frame rate. This produces less than about 1% of the skew between the two different images compared to the active switching method described above. Thus, the present method operates essentially like simultaneous imaging using dual projectors. In additional embodiments, a direct emitting display such as an LED wall could be driven at bit segment rates and utilize discrimination between two different image views, such as through different polarization on alternating pixels or different spectra on alternating pixels.

With regard to the use of alternating bit segments, it is helpful to note that an image is composed of rows and columns of pixels. Each pixel of a frame has associated data that represents the light intensity and, in multicolor displays, the color of the pixel. The data is comprised of one or more binary bits (zeros or ones). The value each bit represents may be a binary weighting (powers of 2), or some other, possibly arbitrary, weighting.

In order to enable a digital display system to show more gray shades than the intrinsic capabilities of the digital imaging device, some sort of modulation in time of the digital imaging device is required, e.g. PWM. The digital imaging device is modulated with a signal such that the intensities of the displayed pixels average to the desired gray shade, over a time frame short enough that the human vision system will perceive these average pixel levels, rather than the modulating signal.

One approach to generating this digital imaging device modulating signal is to convert the incoming image data into bit planes, with each bit plane representing a bit weight of the intensity values. If each pixel's intensity is represented by an N-bit value, each image frame will have N bit planes. Each bit plane has a 0 or 1 value for each pixel. The bit weight is often binary (i.e. a power of two), but is not limited to binary ratios. For example, a 4-bit video signal may have 4 bit planes, with bit weights of 0.5, 0.25, 0.125, and 0.0625. Equivalently, the weights may be stated in integer form: (8, 4, 2, and 1), as the salient aspect of the bit weights is their ratios.

Using multi-level halftoning (multitoning), the incoming image data can be converted to a representation using more, or fewer, bits per pixel. Multitoning can also convert from a binary (bits are powers of 2) representation to a representation with arbitrary weights per bit. This provides the ability to use arbitrary numbers of bit planes, with arbitrary bit weights, as will be apparent to one skilled in the art of multitoning.

Each image is displayed for an amount of time called the frame time. An image frame can be subdivided into time slots, known as bit segments. Each bit segment is displayed for an amount of time that is proportional to the desired bit weight of the bit segment. The bit segments can be all the same weight, or they can vary by segment. If the illumination is variable, this will also affect the bit weight of the bit segments. Some digital displays (e.g. DMD) can produce shorter bit segments if one or more adjacent bit segment is lengthened. Short bit segments are desired for high effective bit depth, but require more data bandwidth and device speed.

Each bit plane is displayed in one or more bit segments, with the bit weight of each bit plane being equal to the sum of the bit weights of the associated bit segments. The length of time each bit plane is displayed is proportional to the bit weight of the bit plane. During a bit segment, all the pixels of a binary display will be ON or OFF, depending on the related bit plane data.

Due to display device characteristics, there may be a small time skew across the device, resulting in the bit plane data being displayed at slightly different times in different areas. Display devices may update the bit plane data pixel-by-pixel, line-by-line, or in blocks, depending on the device capabilities.

Multi-bit bit planes can be used to operate digital displays that can produce more than two shades (ON and OFF). The number of bits per bit plane is a function of the number of possible shades provided by the digital display device, as will be apparent to one skilled in the art.

The arrangement of the bit segments in time and their associated bit weights and bit planes, is called the bit sequence (the "sequence"). The design of bit sequences involves reconciling the various aspects of display quality, including bit depth, dark noise, bandwidth, light efficiency, color artifacts, and motion artifacts.

Typically, not all possible combinations of bit planes are used. For example, a cinema display running at 24 frames per second and using a DMD with an average bit segment of 170 µs can display about 260 bit segments per frame. Using one bit plane per bit segment, if every possible combination of bit planes was used, there would be 2^260 combinations, or about 10^78. This is obviously more than is required or practical. In addition, many combinations are redundant, as they have the same or very similar bit weight. In practice, a subset of combinations is chosen, with a total count ranging from dozens to hundreds of combinations. Each chosen combination of bit planes, termed a "bit code", has an aggregate bit weight, and thus a gray level, as well as a bit vector representing the bit planes that should be ON, or '1'.

Almost all sequences used in applications at or below 120 frames per second, use repeated sub-sequences of identical, or nearly identical, arrangements of bit segments and bit planes. This provides an opportunity to apply multiple halftone or multitone images to a secondary display. For example, DMD cinema displays operating at 24 frames per second are actually displaying each image four times, for a 96 Hz. sub-frame rate. This gives the opportunity to have four halftone images, which, when integrated by the human visual system, gives the appearance of two extra bits of bit depth. Another way of describing this effect is that the halftone dots appear at 25% contrast, rather than 100% contrast. (See U.S. Pat. Nos. 6,774,916 and 7,446,785 and 7,576,759, incorporated herein by reference).

The present method switches back and forth between left and right eye data at single bit segment or multiple bit segment rates in a single projected image to create high quality 3D stereo or multi-viewer imaging with no motion artifacts.

BRIEF DESCRIPTION OF THE DRAWINGS

FIG. 2 shows a schematic for a bit sequence containing alternating bit segments, where the bit segments alternate on the basis of color, in accordance with preferred embodiments described herein.

FIG. 3 shows a schematic for a bit sequence containing alternating bit segments, where the bit segments alternate between the two light sources or lasers, in accordance with preferred embodiments described herein.

FIG. 4 shows a schematic for a bit sequence containing alternating multiple bit segments, where the bit segments alternate based on color, in accordance with preferred embodiments described herein.

FIG. 5 shows a schematic for a bit sequence containing alternating multiple bit segments, where the bit segments alternate based on light source or laser, in accordance with preferred embodiments described herein.

FIG. 6 shows a schematic for a bit sequence containing alternating bit segments, where the bit segments alternate based on light source or laser, in accordance with preferred embodiments described herein.

FIG. 7 shows a schematic for a bit sequence containing alternating multiple bit segments, where the bit segments alternate based on light source or laser, in accordance with preferred embodiments described herein.

DETAILED DESCRIPTION OF PREFERRED EMBODIMENTS

Figure 1:
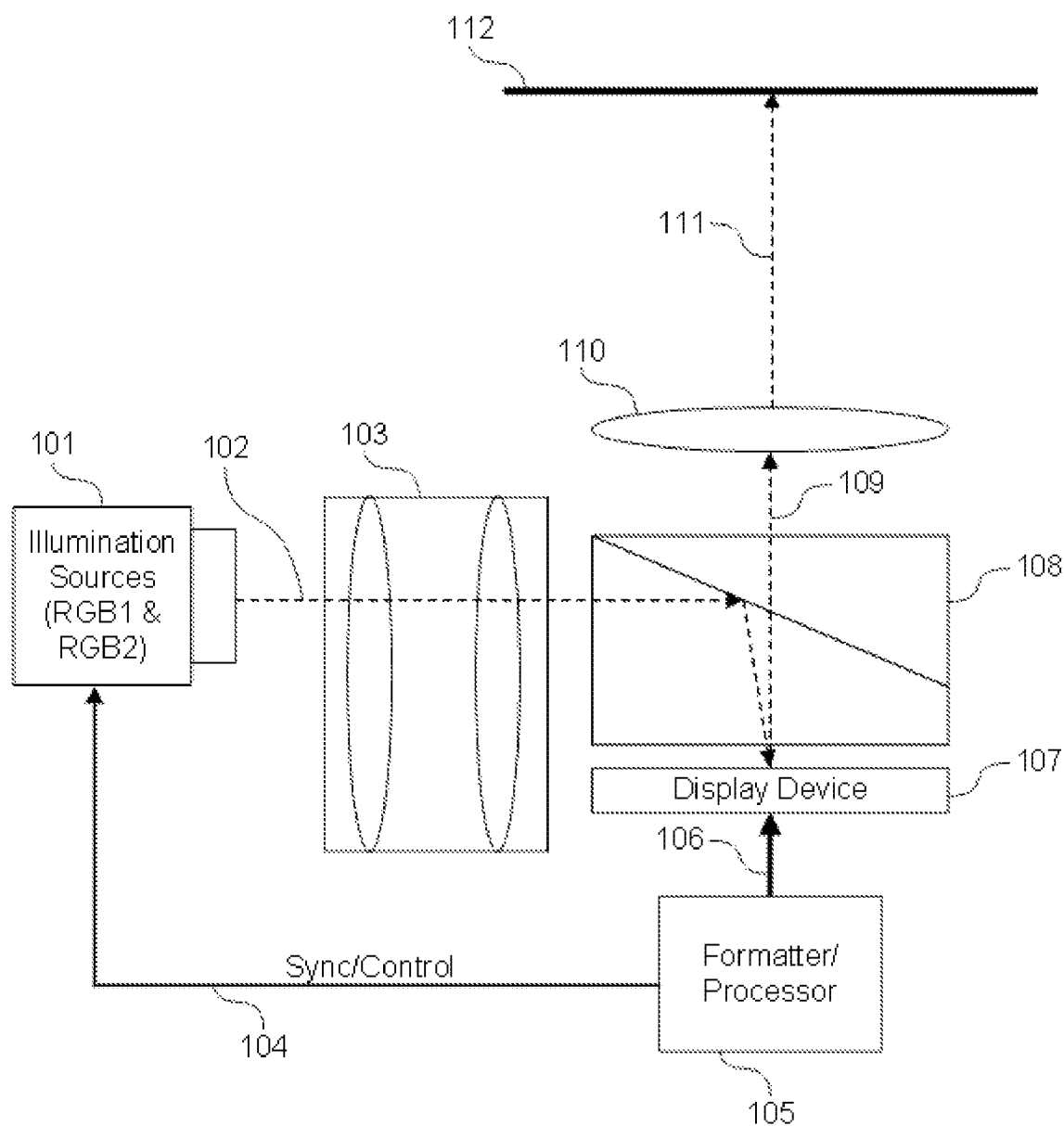
FIG. 1 shows a schematic for an exemplary apparatus for multiple image projection that utilizes different color spectrums (RGB1 and RGB2) in accordance with preferred embodiments described herein.

The present method relates to the use of temporal switching at a bit segment rate to produce three dimensional (3D) or multi-viewer images with no motion artifacts.

In preferred embodiments, the present method utilizes a light source that switches between different formats that are capable of being filtered separately into two different images. The light source is preferably capable of switching between two different sets of primaries, one for image 1 only (e.g., RGB1) and one for image 2 only (e.g., RGB2), at a bit segment. In additional preferred embodiments, the light source switches between different polarizations that can be discriminated at the bit segment, rather than the frame rate as in current methods. Examples of the light source include LEDs, lasers, and laser phosphor. The present method also utilizes a projector that receives and syncs with the light source to create projected images from the received light.

In the present method, data for two different images is created to have a feature capable of distinguishing between the two, such as different spectra or different polarization or a combination of features. The projector is programmed or formatted to access both sets of data and switch back and forth between the two at a single bit segment or multiple bit segment rate to create a single 3D or multi-view projected image containing both sets of data. The programming is based on sequences of bit segments of certain lengths, divided between the two different images. The projector is programmed to command bursts of light, or pulses, from the light source at certain lengths in sync with the bit segments. The resulting image contains both sets of data, one for each image. A pair of glasses can be utilized to filter the correct data for each eye or viewer, preferably based on color spectrum or on polarization. The switching takes place at such a high rate (a bit segment rate compared to a frame rate) that the result is high quality 3D or multi-viewer stereo imaging with no motion artifacts caused by alternate image temporal skew.

As an example, images for DLP Cinema are created using a complex PWM based approach to break up the light into different time slices called "bit segments." Bigger bits are split into smaller segments to avoid artifacts created by larger pulses of lights in large bit weights. Each color of light may typically be modulated by using 12 to 24+ bit segments to create a smooth PWM grayscale on each color. Typically, these bit segments last from 10 to 500 microseconds before a different bit segment is displayed. A full image is created once all of the bit segments in a frame are displayed. If the projector can hold 2 frames of data in memory simultaneously, and it can switch color spectra at rates supporting bit segments (10-500 micro seconds), then a sequence of alternating bit segments can be used to show bit segment 1 for image 1, followed by bit segment 1 for image 2, then back to bit segment 2 for image 1, and so on. This will utilize twice as many bit segments for a given 3D or multi-viewer image. More bit segments generally provide better image quality so the projector should be able to support more bit segments than "normal" 2D or single viewer operation. Twice the number of bit segments per frame is ideal in order to achieve the same 3D or multi-viewer image quality that was achieved in 2D or single viewer mode with the same sequence. This approach will create equivalents of two different images to be formed by alternating bit segments, simultaneously eliminating almost all temporal skew between the images.

FIG. 1 shows a schematic for an exemplary apparatus for multiple image projection that utilizes different color spectrums (RGB1 and RGB2) in accordance with preferred embodiments described herein. As shown in FIG. 1, illumination sources 101, which may be different lasers contained within a single light source, provide RGB1 and RGB2 illumination. The light 102 is projected onto the display device 107 through relay optic 103 and TIR prism 108. The formatter/processor 105 utilizes sync/control signals 104 to coordinate the video data 106 and appropriate color spectrum light 102 (RGB1 or RGB2) to create the image 109 produced by the display device 107. The image 111 is projected onto a screen or target 112 by projection lens 110.

In additional preferred embodiments, a sequence of bit segments prepared for a 2D image is doubled, with each original bit segment being essentially duplicated to produce two bit segments, each having about half the time of the original bit segment's duration. Each pair of bit segments is made up of one left eye or viewer1 bit segment and one right eye or viewer2 bit segment, with the left eye or viewer1 bit segment utilizing a first RGB1 spectrum and the right eye or viewer2 bit segment utilizing a second RGB2 spectrum. Other than the different spectra, the bit segment are identical. The bit segments are displayed in alternating fashion, with the left eye or viewer1 bit segment followed by the right eye or viewer2 bit segment, or vice versa, to produce a single 3D or multi-viewer image made up of the data for two different images. A viewer having the appropriate glasses will perceive the left eye or viewer1 image data separately from the right eye or viewer2 image data to produce a high quality 3D or multi-viewer image.

In additional preferred embodiments, a sequence of bit segments prepared for a 2D image is doubled, with each original bit segment being essentially duplicated to produce two bit segments, each having about half the time of the original bit segment's duration. Either the left or the right (viewer1 or viewer2) sequence of bit segments is time-reversed, allowing long bit segments from the left (or viewer1) sequence to be paired with short bit segments from the right (or viewer2) sequence and vice versa. Each pair of bit segments is made up of one left eye (or viewer1) bit segment and one right eye (or viewer2) bit segment, with the left eye (or viewer1) bit segment utilizing a first RGB1 spectrum and the right eye (or viewer2) bit segment utilizing a second RGB2 spectrum. Other than the different spectra, the bit segments are identical. The bit segments are displayed in alternating fashion, with the left eye (or viewer1) bit segment followed by the right eye (or viewer2) bit segment, or vice versa, to produce a single 3D (or multi-viewer) image made up of the data for both eyes (or two different images). A viewer having the appropriate glasses will perceive the left eye (or viewer1) image data separately from the right eye (or viewer2) image data to produce a high quality 3D (or multi-viewer) image.

FIG. 2 shows a schematic for a preferred embodiment of a bit sequence containing alternating bit segments, where the bit segments alternate on the basis of color.

FIG. 3 shows a schematic for a preferred embodiment of a bit sequence containing alternating bit segments, where the bit segments alternate between the two light sources or lasers.

FIG. 4 shows a schematic for a preferred embodiment of a bit sequence containing alternating multiple bit segments, where the bit segments alternate based on color.

FIG. 5 shows a schematic for a preferred embodiment of a bit sequence containing alternating multiple bit segments, where the bit segments alternate based on light source or laser.

FIG. 6 shows a schematic for a preferred embodiment of a bit sequence containing alternating bit segments, where the bit segments alternate based on light source or laser.

FIG. 7 shows a schematic for a preferred embodiment of a bit sequence containing alternating multiple bit segments, where the bit segments alternate based on light source or laser.

REFERENCES

U.S. Patent Documents

U.S. Pat. No. 6,774,916
U.S. Pat. No. 7,446,785
U.S. Pat. No. 7,576,759

What is claimed is:

1. A method for producing a three-dimensional (3D) or multi-viewer image, comprising:
   preparing a series of alternating bit segments corresponding to an image, wherein the series of alternating bit segments comprises a plurality of pairs of bit segments, wherein each pair of bit segments consists of a first bit segment comprising a first set of image data and a second bit segment comprising a second set of image data, and wherein the first set of image data and the second set of image data differ with regard to a distinguishing characteristic; and
   projecting the series of alternating bit segments to produce the three-dimensional (3D) or multi-viewer image for at least one viewer, wherein the viewer utilizes a viewing device that allows the first set of image data to be perceived separately from the second set of image data as a result of the distinguishing characteristic, and wherein the alternating bit segments of the three-dimensional (3D) or multi-viewer image switch between the first set of image data and the second set of image data at a rate of about 10 to about 500 micro seconds.

2. The method of claim 1, wherein the first set of image data is viewable by a first eye of the viewer and the second set of image data is viewable by a second eye of the viewer.

3. The method of claim 1, wherein the first set of image data is viewable by a first viewer and the second set of image data is viewable by a second viewer.

4. The method of claim 1, wherein the distinguishing characteristic is color spectrum or light polarization.

5. The method of claim 1, wherein the viewing device is a pair of glasses having filters for each eye.

6. An apparatus for use in multiple image projection utilizing different color spectrums, comprising:
   illumination sources for producing illumination utilizing a first color spectrum and a second color spectrum;
   a display device for receiving the illumination produced by the illumination sources, for receiving video data, and for producing an image;
   a formatter or processor for transmitting the video data to the display device and for sending sync/control signals to the illumination sources to coordinate the video data with the illumination produced by the illumination sources to direct the display device to produce the image, wherein the image comprises a series of alternating bit segments, wherein the series of alternating bit segments comprises a plurality of pairs of bit segments, wherein each pair of bit segments consists of a first bit segment comprising a first set of image data using the first color spectrum and a second bit segment comprising a second set of image data using the second color spectrum, and wherein the alternating bit segments of the image switch between the first set of image data and the second set of image data at a rate of about 10 to about 500 micro seconds;
   a projector for projecting the image for at least one viewer; and
   a viewing device used by the viewer that allows the first set of image data to be perceived separately from the second set of image data as a result of the different color spectrums.

* * * * *